(12) United States Patent
Parag et al.

(10) Patent No.: US 10,756,993 B2
(45) Date of Patent: Aug. 25, 2020

(54) STORAGE SYSTEM ROOT CAUSE ANALYSIS AND MONITORING

(71) Applicant: International Business Machines Corporation, Armonk, NY (US)

(72) Inventors: Nadav Parag, Tel Aviv (IL); Yoni Raveh, Modin (IL); Vladimir Shalikashvili, Petah Tiqwa (IL); Moshe Weiss, Petah Tiqwa (IL)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 15/883,433

(22) Filed: Jan. 30, 2018

(65) Prior Publication Data

US 2019/0238432 A1 Aug. 1, 2019

(51) Int. Cl.
*G06F 3/048* (2013.01)
*H04L 12/26* (2006.01)
*H04L 12/24* (2006.01)
*G06T 11/20* (2006.01)
*H04L 29/08* (2006.01)
*G06F 3/0484* (2013.01)

(52) U.S. Cl.
CPC .......... *H04L 43/045* (2013.01); *G06T 11/206* (2013.01); *H04L 41/0631* (2013.01); *H04L 41/12* (2013.01); *H04L 41/22* (2013.01); *H04L 43/08* (2013.01); *H04L 67/1097* (2013.01); *G06F 3/0484* (2013.01); *H04L 41/5003* (2013.01); *H04L 43/16* (2013.01)

(58) Field of Classification Search
CPC ...... G06F 3/048; G06F 3/0481; G06F 3/0482; G06F 3/0484; G06F 15/177; G06T 11/20; G06T 11/206; H04L 12/24; H04L 12/26; H04L 41/12; H04L 41/22; H04L 43/045; H04L 67/1097
See application file for complete search history.

(56) References Cited

U.S. PATENT DOCUMENTS 8,437,731 B2 5/2013 Reich et al.
8,650,492 B1 2/2014 Mui et al.
(Continued)

OTHER PUBLICATIONS

Muller, Georg et al., "Reducing Energy Consumption in Pharmaceutical Production Processes: Framework and Case Study", Springer Science+Business Media, Journal of Pharmaceutical Innovation, vol. 9, No. 3, Sep. 2014, pp. 212-226.

(Continued)

*Primary Examiner* — Xiomara L Bautista
(74) *Attorney, Agent, or Firm* — Stephen J. Walder, Jr.; Francis Lammes; Jason Sosa (57) ABSTRACT

A storage system analysis and monitoring mechanism performs root cause analysis and monitoring of a storage system via a single view of the storage system. A set of objects are identified within the storage system, where the identification of the set of objects is performed by at least one of a topology discovery or a data structure search. For each object in the set of objects, one or more interconnections to one or more other objects in the set of objects are identified. A view of the storage system is then generated in a graphical user interface showing each of the objects in the set of objects and, for each object in the set of objects, the one or more interconnections to one or more other objects in the set of objects.

20 Claims, 5 Drawing Sheets

(56) References Cited

U.S. PATENT DOCUMENTS

| | | |
|---|---|---|
| 2015/0081701 A1 | 3/2015 | Lerios et al. |
| 2016/0248644 A1* | 8/2016 | Dontcheva ............ H04L 43/045 |
| 2017/0039233 A1 | 2/2017 | Gauthier et al. |
| 2017/0039491 A1 | 2/2017 | Gauthier et al. |
| 2017/0098318 A1 | 4/2017 | Lannaccone et al. |
| 2018/0077119 A1* | 3/2018 | Fields ................. H04L 63/0263 |
| 2018/0232110 A1* | 8/2018 | Cheung ............... G06F 16/3331 |

OTHER PUBLICATIONS

Riehmann, Patrick et al., "Interactive Sankey Diagrams", IEEE, IEEE Symposium on Information Visualization, Minneapolis, MN, Oct. 23-25, 2005, pp. 233-240.

* cited by examiner

STORAGE SYSTEM ROOT CAUSE ANALYSIS AND MONITORING

BACKGROUND

The present application relates generally to an improved data processing apparatus and method and more specifically to mechanisms for performing root cause analysis and monitoring of a storage system via a single view of the storage system that shows all the configuration objects of the storage system.

The term storage management encompasses technologies and processes organizations utilize to maximize or improve the performance of their data storage resources. Storage management is a broad category that includes virtualization, replication, mirroring, security, compression, traffic analysis, process automation, storage provisioning, and related techniques. By some estimates, the amount of digital information stored in the world's computer systems is doubling every year. As a result, organizations feel constant pressure to expand their storage capacity. However, doubling a company's storage capacity every year is an expensive proposition. In order to reduce some of those costs and improve the capabilities and security of their storage solutions, organizations turn to a variety of storage management solutions.

Many storage management technologies, like storage virtualization, deduplication, and compression, allow companies to better utilize their existing storage. The benefits of these technologies include lower costs—both the one-time capital expenses associated with storage devices and the ongoing operational costs for maintaining those devices. Most storage management techniques also simplify the management of storage networks and devices, which allows companies to save time and even reduce the number of information technology (IT) workers needed to maintain their storage systems, which in turn, also reduces overall storage operating costs. Storage management may also help improve a data center's performance. For example, compression and technology may enable faster input/output (I/O) operations, and automatic storage provisioning may speed the process of assigning storage resources to various applications.

In addition, virtualization and automation technologies may help an organization improve its agility. These storage management techniques make it possible to reassign storage capacity quickly as business needs change, reducing wasted space and improving a company's ability to respond to evolving market conditions. Finally, many storage management technologies, such as replication, mirroring and security, may help a data center improve its reliability and availability. These techniques are often particularly important for backup and archive storage, although they also apply to primary storage. IT departments often turn to these technologies for help in meeting service level agreements (SLAs) or achieving compliance goals.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for performing root cause analysis and monitoring of a storage system via a single view of the storage system. The illustrative embodiment identifies a set of objects within the storage system, where the identification of the set of objects is performed by at least one of a topology discovery or a data structure search. For each object in the set of objects, the illustrative embodiment identifies one or more interconnections to one or more other objects in the set of objects, where the identification of the one or more interconnections is performed by at least one of the topology discovery or the data structure search. The illustrative embodiment generates a view of the storage system in a graphical user interface showing each of the objects in the set of objects and, for each object in the set of objects, the one or more interconnections to one or more other objects in the set of objects.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for performing root cause analysis and monitoring of a storage system via a single view of the storage system showing all objects and configuration of the objects within the storage system. As noted above, current storage management technologies provide benefits to organizations, such as lowering costs, simplifying the management of storage networks and devices, improving a data center's performance, improving the agility of the organization, and improving reliability and availability. However current storage management technologies fail to provide an interface that represents all the various portions of the storage area network in a single view. That is, current storage management technologies use components like command line interface (CLI) or graphical user interface (GUI) widgets such as grid tables, graphs, popups, and relation diagrams of an object to other objects in flat view in order to give a user tools to analyze the complex relations of a configuration of a storage management system. However, as one example, if the user wants to monitor all the host ports that a specific volume is attached to, the user has to first locate the volume in one view. Once the volume is identified, then the user has to locate all the hosts mapped to this volume in a second view. For each host, the user has to utilize a third view to locate each host port that is connected to the specific system in which the volume resides. If all host ports coupled to the volume reside in the third view then, the user only had to make three view transitions. However, since it is rare that all hosts ports coupled to the volume reside in an associated view, then the user has to make additional transitions to other views to see the entire host ports coupled to the volume.

As another example, if a user wants to find all the snapshot groups of a host, the user has to first locate the host. For the host, the user has to switch to another view to locate all the volumes mapped to the host and yet another view to locate all of the consistency groups containing the volumes. The user then has to switch to a fourth view to locate the snapshot groups for the identified consistency groups. The number of views transitions is four at best or much more than that if there is no aggregation with easy navigation or filter.

The illustrative embodiments provide a mechanism that shows all objects and a configuration of the objects of a storage system in a single view. For example, one view of storage system, which will be described in detail below, shows the objects within the storage system, such as a plurality of hosts coupled to a plurality of volumes defined by ports, domains, pools, consistency groups, and the like, all connected with respective interconnects. The view is zoomable in order to change the granularity of the objects being viewed. Layers of performance metrics may be added or removed on the connected lines between the objects, with each performance metric identified by means of line coloring representing a level of performance. The view may be customized to sort the objects in the view based on various values of the specific objects showing values that are most important to the user, such as mirroring status, size of the objects, status of a host, or the like. If a particular name of a host, volume, domain, or the like, is known, the user may enter the name and the mechanisms highlight the named object as well as all interconnections to the object. Similarly, if the user hovers over an object, the mechanisms highlight the object as well as all interconnections to the object. If the object is then selected by the user, then the user may zoom in on the highlighted object, or any connected object to view a more specific granularity. By providing a mechanism that shows all objects and a configuration of the objects of a storage system in a single view, the user may perform more detailed root cause analysis and monitoring of the storage system without having to continuously change views.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
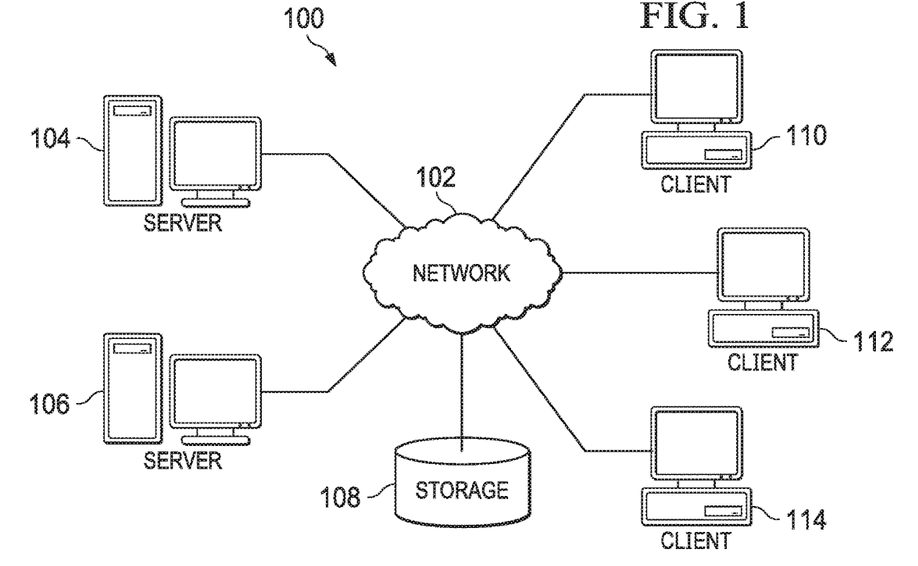
FIG. 1 is an example diagram of a distributed data processing system in which aspects of the illustrative embodiments may be implemented.
Figure 2:
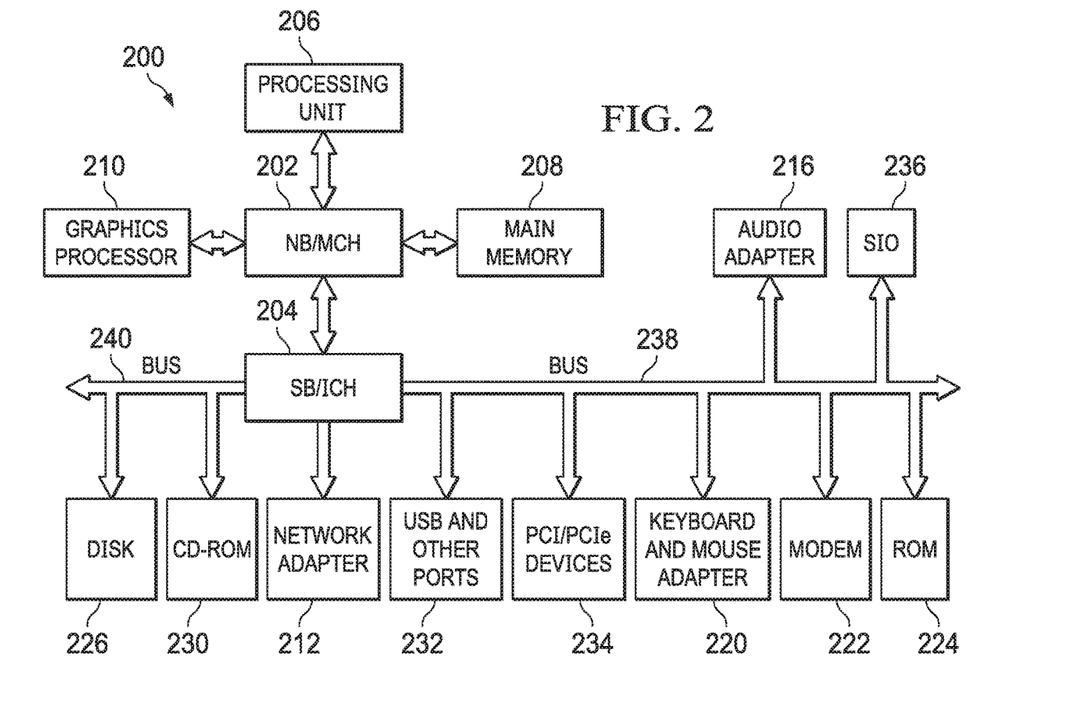
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism that shows all objects and a configuration of the objects of a storage system in a single view in order to provide more efficient root cause analysis and monitoring of the storage system. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates root cause analysis and monitoring of a storage system via a single view of the storage system showing all objects and configuration of the objects within the storage system.

As noted above, the mechanisms of the illustrative embodiments utilize specifically configured computing devices, or data processing systems, to perform the operations for performing root cause analysis and monitoring of a storage system via a single view of the storage system showing all objects and configuration of the objects within the storage system. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to showing all objects and a configuration of the objects of a storage system in a single view in order to perform root cause analysis and monitoring of the storage system in a more efficient manner.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
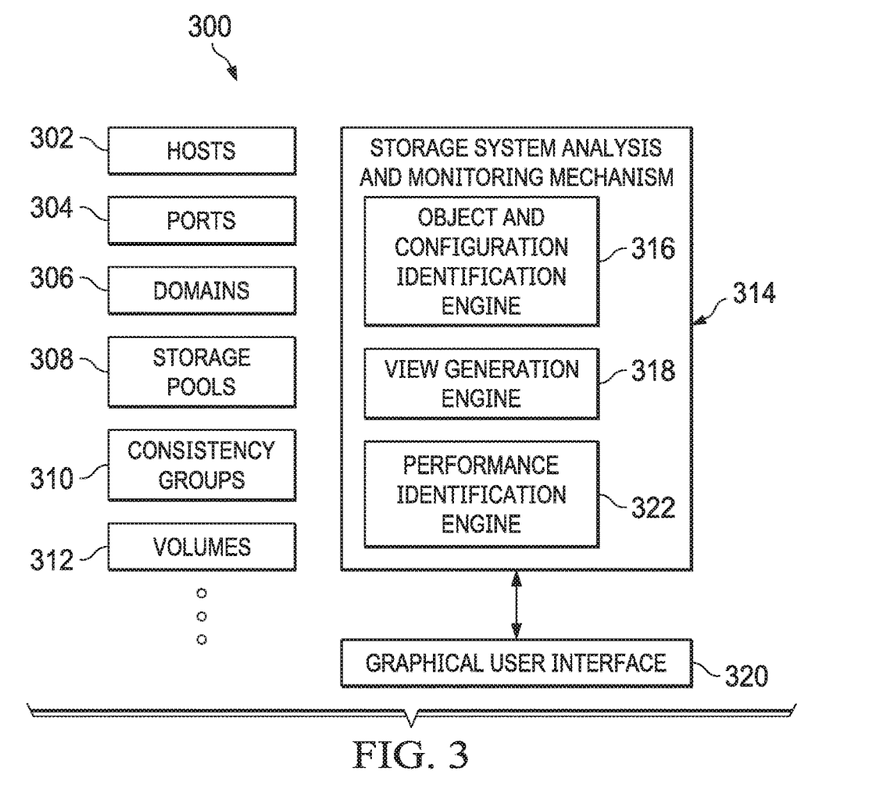
FIG. 3 depicts an exemplary functional block diagram of a storage system analysis and monitoring mechanism for performing root cause analysis and monitoring of a storage system via a single view of the storage system showing all objects and configuration of the objects within the storage system in accordance with an illustrative embodiment.

FIG. 3 depicts an exemplary functional block diagram of a storage system analysis and monitoring mechanism for performing root cause analysis and monitoring of a storage system via a single view of the storage system showing all objects and configuration of the objects within the storage system in accordance with an illustrative embodiment. Storage system 300 comprises numerous objects such as hosts 302, ports 304, domains 306, storage pools 308, consistency groups (CGs) 310, volumes 312, and the like. That is, while the Figures depict objects such as hosts 302, ports 304, domains 306, storage pools 308, CGs 310, and volumes 312, one of ordinary skill in the art would recognize that a storage system, such as storage system 300, may comprises all of these objects as well as many more, without departing from the spirit and scope of the invention.

Each host of hosts 302 are computing devices that offer information resources, services, and applications to users or other nodes. Each port of ports 304 are an endpoint to a logical connection and the way a client program specifies a specific program on each of hosts 302. Each domain of domains 306 are a group of computers and devices, in this example hosts 302, which are administered as a unit with common rules and procedures. Each storage pool of storage pools 308 associated with its respective domain in domains 306 comprises a set of volumes 312 which store replicas, shadow copies, transfer logs, or the like, for hosts 302. Each consistency group of CGs 310 represents a group of volumes 312 that are snapshotted at the same point in time. Consistency groups are essential for snapshotting several volumes that are used by the same application on a host, or by applications that interact with each other to generate a consistent set of snapshots. Each of CGs 310 must be associated with a specific one of storage pools 308. Thus, since a consistency group must always belong to a specific storage pool then all volumes in a consistency group belong to a same storage pool as the consistency group. Each volume of volumes 312 are a single accessible storage area with a single file system, typically (though not necessarily) resident on a single partition of a hard disk. Although a volume might be different from a physical disk drive, the volume may still be accessed with an operating system's logical interface.

Storage system 302 also comprises storage system analysis and monitoring mechanism 314 which provides root cause analysis and monitoring of storage system 300. Storage system analysis and monitoring mechanism 314 comprises object and configuration identification engine 316, view generation engine 318, and performance identification engine 322. Object and configuration identification engine 316 performs one or more of a topology discovery, data structure search, or the like, in order to identify all of the objects within storage system 300, such as hosts 302, ports 304, domains 306, storage pools 308, CGs 310, volumes 312, and the like. Once object and configuration identification engine 316 identifies the objects within storage system 300, object and configuration identification engine 316 identifies through one or more of a topology discovery, data structure search, or the like, which volumes of volumes 312 are associated with which consistency group of CGs 310, which consistency groups of CGs 310 are associated with which storage pool of storage pools 308, which storage pools of storage pools 308 are associated with which domain of domains 306, which domains of domains 306 are associated with which ports of ports 304, and which ports of ports 304 are associated with which host of hosts 302. That is, object and configuration identification engine 316 identifies an association or configuration of the objects within storage system 300, hereinafter referred to as interconnections.

Figure 4:
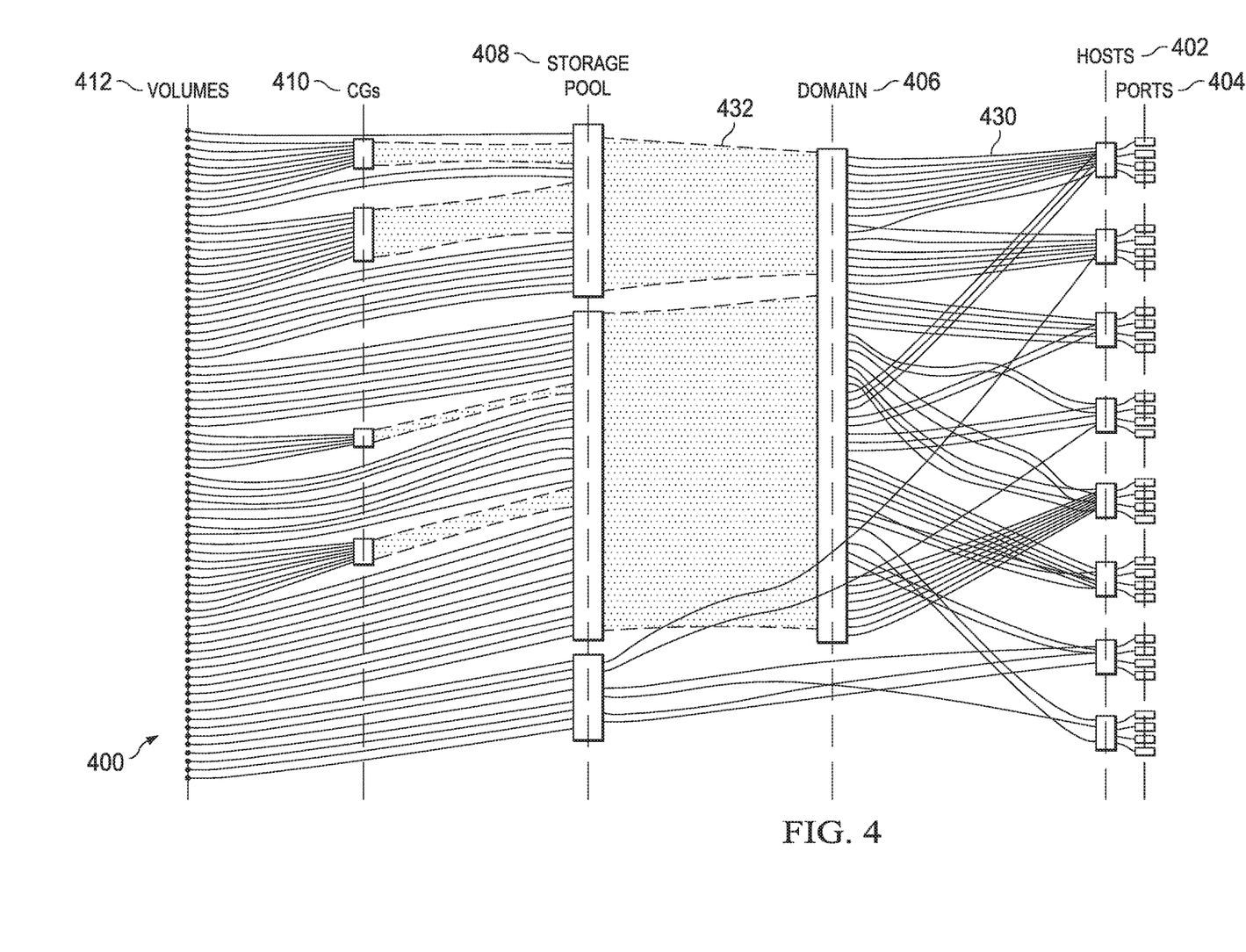
FIG. 4 depicts one example of a single view of a storage system showing all objects and interconnections between the objects within the storage system in accordance with an illustrative embodiment.

Once object and configuration identification engine 316 identifies the objects within storage system 300 and their respective interconnections between the various objects in storage system 300, view generation engine 318 generates a view, such as a Sankey diagram, of storage system 300 in graphical user interface (GUI) 320 showing each of hosts 302, ports 304, domains 306, storage pools 308, CGs 310, and volumes 312 as well as the interconnections, represented by lines. FIG. 4 depicts one example of a single view of a storage system showing all objects and interconnections between the objects within the storage system in accordance with an illustrative embodiment. Moving from left to right, view 400 depicts volumes 412, respectively connected to CGs 410, CGs 410 respectively connected to storage pools 408, storage pools 408 respectively connected to domains 406, domains 406 respectively connected to ports 404 and hosts 402. It should be noted that the thickness of a line between any two objects indicates a number of input/output (I/O) operations that may be served by the interconnect. Thus, line 430 may serve fewer I/Os than line 432.

Figure 5:
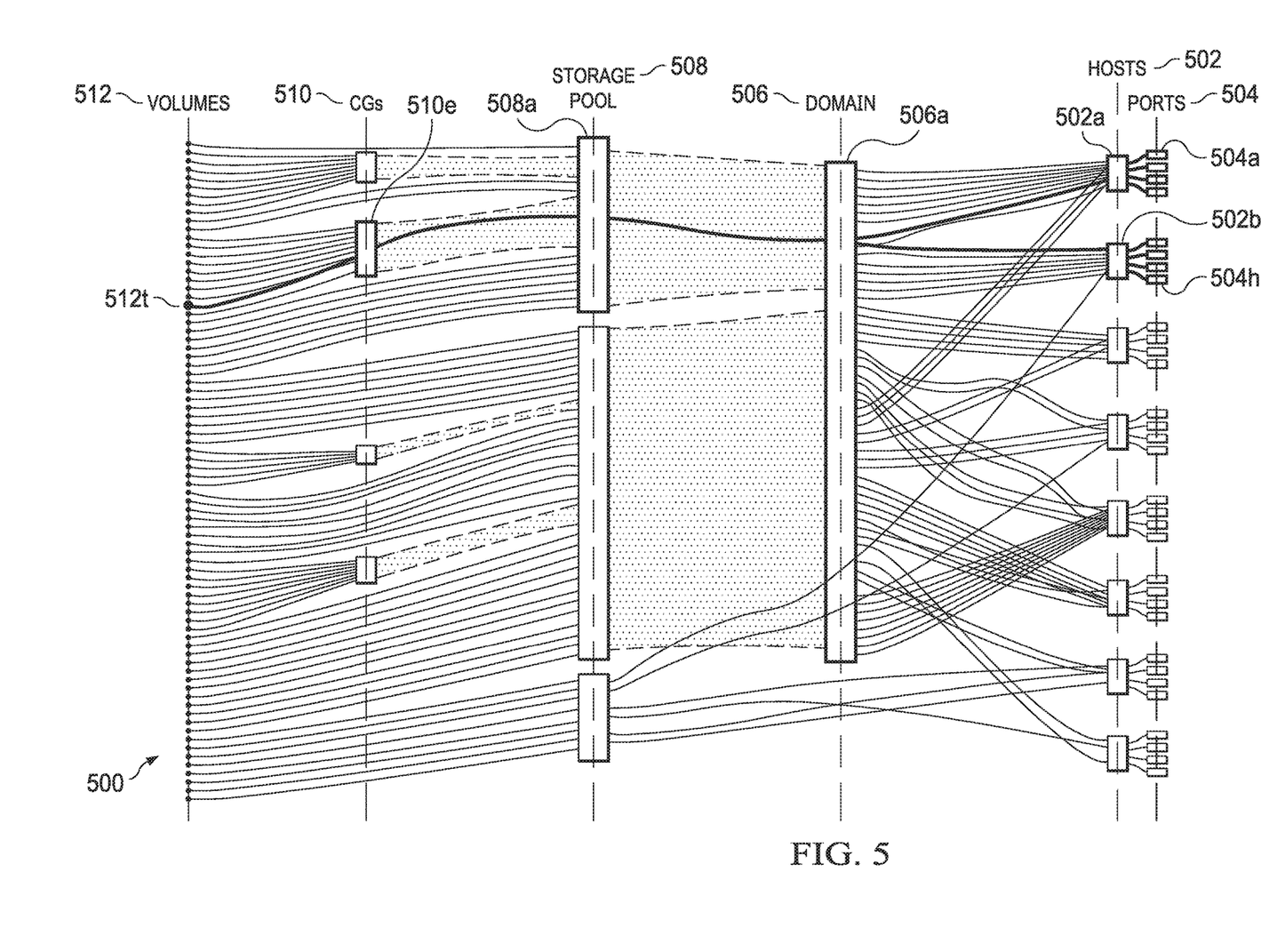
FIG. 5 depicts one example of a single view of a storage system showing the interconnections of a selected object within the storage system in accordance with an illustrative embodiment.

Returning to FIG. 3, once view generation engine 318 generates the view of storage system 300 in GUI 320, storage system analysis and monitoring mechanism 314 provides for user interactions in order to, for example change the granularity of the objects being reviewed. That is, as one example, if the user indicates a focus on just the interconnections between storage pools and domains, then the user may indicated a section of the specific area to be viewed, which object and configuration identification engine 316 uses to identify the selected objects and their interconnections. View generation engine 318 then generates a magnified view showing only the selected area. As another example, if the user indicates focus on a particular port, then object and configuration identification engine 316 uses the selected port to identify interconnections emanating from the port and view generation engine 318 generates a view showing the selected port and the interconnections emanating from the port to respective hosts, then to the domains, etc. Storage system analysis and monitoring mechanism 314 also provides for adding or removing objects. That is, if the user is not concerned with consistency groups, then those objects may be hidden from the view such that view would illustrate only the interconnections between volumes and storage pools. Further, storage system analysis and monitoring mechanism 314 allows for identifying an end-to-end interconnection for any selected object. That is, if a user selects a particular object, such as a volume, then based on the selected volume, object and configuration identification engine 316 identifies the end-to-end interconnects associated with the selected volume and view generation engine 318 shows the selected volume and its interconnections to a respective host(s) through an associated consistency group, associated storage pool, an associated domain, and associated port(s). FIG. 5 depicts one example of a single view of a storage system showing the interconnections of a selected object within the storage system in accordance with an illustrative embodiment. Moving from left to right, view 500 depicts volumes 512, respectively connected to CGs 510, CGs 510 respectively connected to storage pools 508, storage pools 508 respectively connected to domains 506, domains 506 respectively connected to ports 504 and hosts 502. In this view, the user has selected volume 512$t$, which is interconnected to consistency group 510$e$, which is interconnected to storage pool 508$a$, which is interconnected to domain 506$a$, which is connected to hosts 502$a$ and 502$b$ and ports 504$a$-$h$. In FIG. 5, the end-to-end connection is shown by dashed objects and interconnects although this may also be performed by changing the color associated with the identified objects and interconnections.

Returning to FIG. 3, as an additional feature, storage system analysis and monitoring mechanism 314 provides for adding or removing layers of performance metrics to the interconnects. That is, if a user wants to see the performance, such as I/O operations, latency, or the like, of storage system 300, then, based on the user's indication, performance identification engine 322 identifies the performance across each object and interconnection. Based on predefined thresholds associated with, for example, good performance, medium performance, or poor performance, performance identification engine 322 associated an related performance with each object and identification which may be in the form of a color, such as red associated with poor performance, yellow associated with medium performance, and green associated with good performance. Based on the identified performances and using the color identification, view generation engine 318 may change an associated color of each object or interconnect to reflect the performance. The user is also provided with the option to show only those objects and interconnections with a selected performance level, such as only showing all objects and interconnects with poor performance as indicated by performance identification engine 322.

Still further, storage system analysis and monitoring mechanism 314 provides for the presented view to be customized to sort/show only those objects based on values that are most important to the user. For example, if the user wants to see all objects that have a specific feature, such as mirroring status, then object and configuration identification engine 316 identifies all objects within storage system 300 that have mirroring status and view generation engine 318 shows the identified objects in GUI 320. Additionally, storage system analysis and monitoring mechanism 314 provides for identifying an object and its interconnections based on text inputs. That is, if the user provides a particular name of a host, volume, domain, or the like, then object and configuration identification engine 316 identifies the object associated with the identified name and view generation engine 318 shows the object and its associated interconnections in GUI 320.

Figure 6:
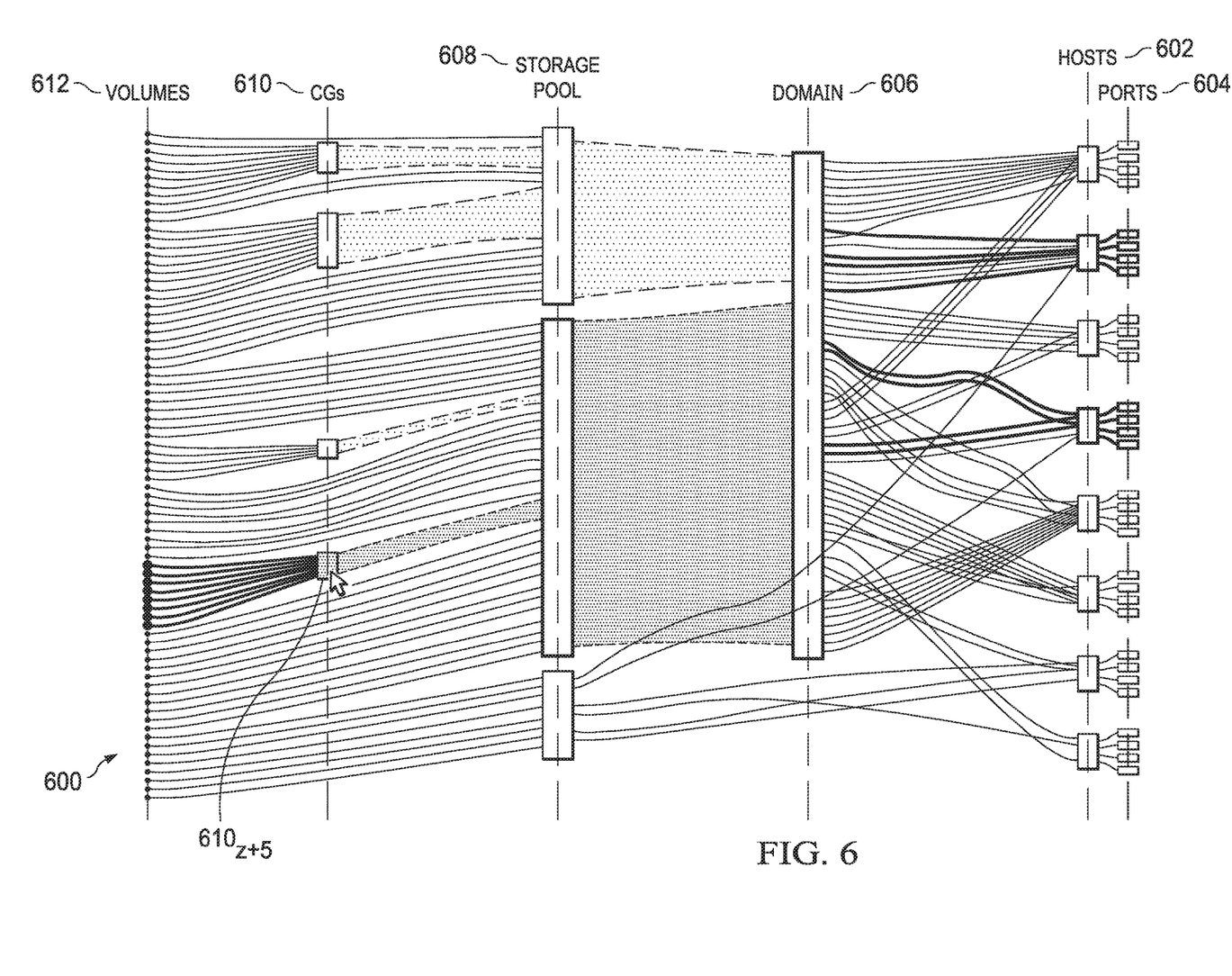
FIG. 6 depicts one example of a single view of a storage system showing the associated objects and interconnections associated with an object which the user has hovered the mouse cursor above in accordance with an illustrative embodiment.

Further, storage system analysis and monitoring mechanism 314 provides for identifying an object and its interconnections based on the user hovering the mouse cursor above a particle object or interconnect. That is, if the user simply hovers the mouse cursor over a particular object or interconnect, object and configuration identification engine 316 identifies the object or interconnect and the associated objects and interconnects and view generation engine 318 shows the object and its associated interconnections in GUI 320 by highlighting the complete end-to end-path. FIG. 6 depicts one example of a single view of a storage system showing the associated objects and interconnections associated with an object which the user has hovered the mouse cursor above in accordance with an illustrative embodiment. Moving from left to right, view 600 depicts volumes 612, respectively connected to CGs 610, CGs 610 respectively connected to storage pools 608, storage pools 608 respectively connected to domains 606, domains 606 respectively connected to ports 604 and hosts 602. In this view, the user hovers the mouse cursor over consistency group $610_{z+5}$, then object and configuration identification engine 316 identifies the consistency group and the associated objects and interconnections associated with the consistency group and view generation engine 318 shows the selected consistency group and related objects and interconnections from end-to end in GUI 320. In FIG. 6, the end-to-end connection is shown by dashed objects and interconnects although this may also be performed by changing the color associated with the identified objects and interconnections.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
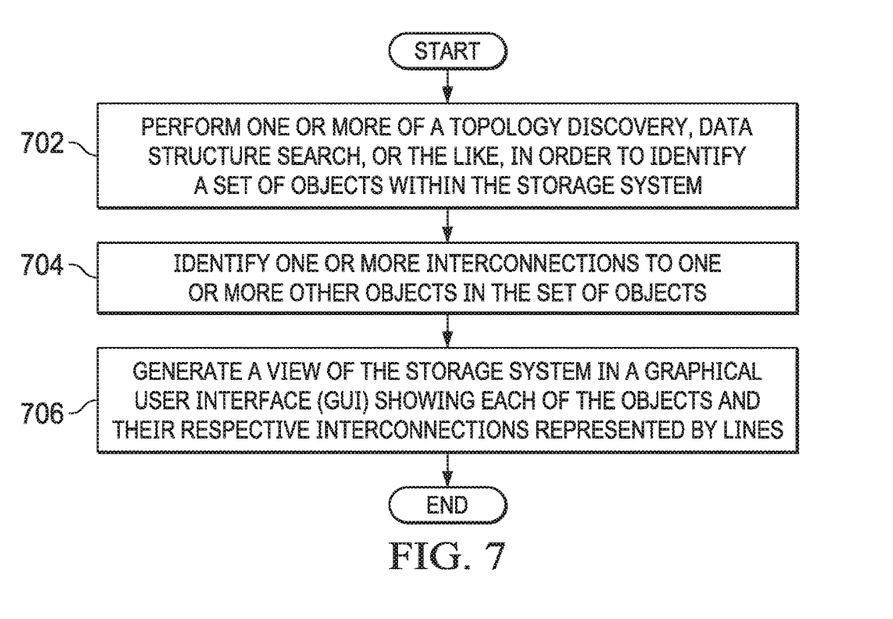
FIG. 7 depicts an exemplary flow diagram of the operations performed by a storage system analysis and monitoring mechanism in performing root cause analysis and monitoring of a storage system via a single view of the storage system showing all objects and configuration of the objects within the storage system in accordance with an illustrative embodiment.

FIG. 7 depicts an exemplary flow diagram of the operations performed by a storage system analysis and monitoring mechanism in performing root cause analysis and monitoring of a storage system via a single view of the storage system showing all objects and configuration of the objects within the storage system in accordance with an illustrative embodiment. As the operation begins, storage system analysis and monitoring mechanism performs one or more of a topology discovery, data structure search, or the like, in order to identify a set of objects within the storage system (step 702), such as hosts, ports, domains, storage pools, consistency groups (CGs), volumes, and the like. The storage system analysis and monitoring mechanism then identifies one or more interconnections to one or more other objects in the set of objects (step 704), referred to herein as interconnections. That is, the storage system analysis and monitoring mechanism identifies which volumes are associated with which consistency group, which consistency groups are associated with which storage pool, which storage pools are associated with which domain, which domains with which ports, and which ports are associated with which host.

Once storage system analysis and monitoring mechanism identifies the objects within the storage system and their respective interconnections between the various objects in the storage system, the storage system analysis and monitoring mechanism generates a view, such as a Sankey diagram, of the storage system in a graphical user interface (GUI) showing each of the objects and their respective interconnections represented by lines (step 706), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms showing all objects and a configuration of the objects of a storage system in a single view. The view is zoomable in order to change the granularity of the objects being viewed. Layers of performance metrics may be added or removed on the connected lines between the objects, with each performance metric identified by means of line coloring representing a level of performance. The view may be customized to sort the objects in the view based on various values of the specific objects showing values that are most important to the user. If a particular name of a host, volume, domain, or the like, is known, the user may enter the name and the mechanisms highlight the named object as well as all interconnections to the object. Similarly, if the user hovers over an object, the mechanisms highlight the object as well as all interconnections to the object. If the object is then selected by the user, then the user may zoom in on the highlighted object, or any connected object to view a more specific granularity. By providing a mechanism that shows all objects and a configuration of the objects of a storage system in a single view, the user may perform more detailed root cause analysis and monitoring of the storage system without having to continuously change views.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments.

The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause a storage system analysis and monitoring mechanism to perform root cause analysis and monitoring of a storage system via a single view of the storage system, wherein the storage system analysis and monitoring mechanism operates to:
   identify a set of objects within the storage system, wherein the identification of the set of objects is performed by at least one of a topology discovery or a data structure search;
   for each object in the set of objects, identify one or more interconnections to one or more other objects in the set of objects, wherein the identification of the one or more interconnections is performed by at least one of the topology discovery or the data structure search; and
   generate a view of the storage system in a graphical user interface showing each of the objects in the set of objects and, for each object in the set of objects, the one or more interconnections to one or more other objects in the set of objects.

2. The method of claim 1, wherein the view is a Sankey diagram.

3. The method of claim 1, wherein the storage system analysis and monitoring mechanism further operates to:
   responsive to the user selecting a section of the view, magnify the selected section such that only the selected section is shown in the graphical user interface.

4. The method of claim 1, wherein the storage system analysis and monitoring mechanism further operates to:
   responsive to the user selecting an object in the set of objects, displaying an end-to-end connection of the object to other objects in the set of objects.

5. The method of claim 1, wherein the storage system analysis and monitoring mechanism further operates to:
   responsive to the user indicating a set of objects to remove from the view, hiding the objects from the view in the graphical user interface while still displaying an end-to-end connection of the object to other objects in the set of objects.

6. The method of claim 1, wherein the storage system analysis and monitoring mechanism further operates to:
   responsive the user indicating that a performance metric be identified with each object in the set of objects and each of the one or more interconnections to the one or more other objects in the set of objects, displaying in the view an indication of a performance of each object and each interconnection, wherein the displayed indication is based on one or more thresholds related to the associated performance.

7. The method of claim 1, wherein the storage system analysis and monitoring mechanism further operates to:
   responsive to the user selecting a feature of provided by an object, identifying in the view one or more objects in the set of objects that have the selected feature.

8. The method of claim 1, wherein the storage system analysis and monitoring mechanism further operates to:
   responsive to the user providing a text input, identifying in the view one or more objects have a name associated with the text input.

9. A computer program product comprising a non-transitory computer readable storage medium having a computer readable program stored therein, wherein the computer readable program, when executed on a computing device, causes the computing device to:
   identify a set of objects within a storage system, wherein the identification of the set of objects is performed by at least one of a topology discovery or a data structure search;
   for each object in the set of objects, identify one or more interconnections to one or more other objects in the set of objects, wherein the identification of the one or more interconnections is performed by at least one of the topology discovery or the data structure search; and
   generate a view of the storage system in a graphical user interface showing each of the objects in the set of objects and, for each object in the set of objects, the one or more interconnections to one or more other objects in the set of objects.

10. The computer program product of claim 9, wherein the view is a Sankey diagram.

11. The computer program product of claim 9, wherein the computer readable program further causes the computing device to:
    responsive to the user selecting a section of the view, magnify the selected section such that only the selected section is shown in the graphical user interface.

12. The computer program product of claim 9, wherein the computer readable program further causes the computing device to:
    responsive to the user selecting an object in the set of objects, display an end-to-end connection of the object to other objects in the set of objects.

13. The computer program product of claim 9, wherein the computer readable program further causes the computing device to:
    responsive to the user indicating a set of objects to remove from the view, hide the objects from the view in the graphical user interface while still display an end-to-end connection of the object to other objects in the set of objects.

14. The computer program product of claim 9, wherein the computer readable program further causes the computing device to:
    responsive the user indicating that a performance metric be identified with each object in the set of objects and each of the one or more interconnections to the one or more other objects in the set of objects, display in the view an indication of a performance of each object and each interconnection, wherein the displayed indication is based on one or more thresholds related to the associated performance.

15. An apparatus comprising:
    a processor; and
    a memory coupled to the processor, wherein the memory comprises instructions which, when executed by the processor, cause the processor to:

identify a set of objects within a storage system, wherein the identification of the set of objects is performed by at least one of a topology discovery or a data structure search;

for each object in the set of objects, identify one or more interconnections to one or more other objects in the set of objects, wherein the identification of the one or more interconnections is performed by at least one of the topology discovery or the data structure search; and generate a view of the storage system in a graphical user interface showing each of the objects in the set of objects and, for each object in the set of objects, the one or more interconnections to one or more other objects in the set of objects.

16. The apparatus of claim 15, wherein the view is a Sankey diagram.

17. The apparatus of claim 15, wherein the instructions further cause the processor to:

responsive to the user selecting a section of the view, magnify the selected section such that only the selected section is shown in the graphical user interface.

18. The apparatus of claim 15, wherein the instructions further cause the processor to:

responsive to the user selecting an object in the set of objects, display an end-to-end connection of the object to other objects in the set of objects.

19. The apparatus of claim 15, wherein the instructions further cause the processor to:

responsive to the user indicating a set of objects to remove from the view, hide the objects from the view in the graphical user interface while still displaying an end-to-end connection of the object to other objects in the set of objects.

20. The apparatus of claim 15, wherein the instructions further cause the processor to:

responsive the user indicating that a performance metric be identified with each object in the set of objects and each of the one or more interconnections to the one or more other objects in the set of objects, display in the view an indication of a performance of each object and each interconnection, wherein the displayed indication is based on one or more thresholds related to the associated performance.

* * * * *